R. BURNS.
Corn-Planter.
No. 48,655.
Patented July 11, 1865.
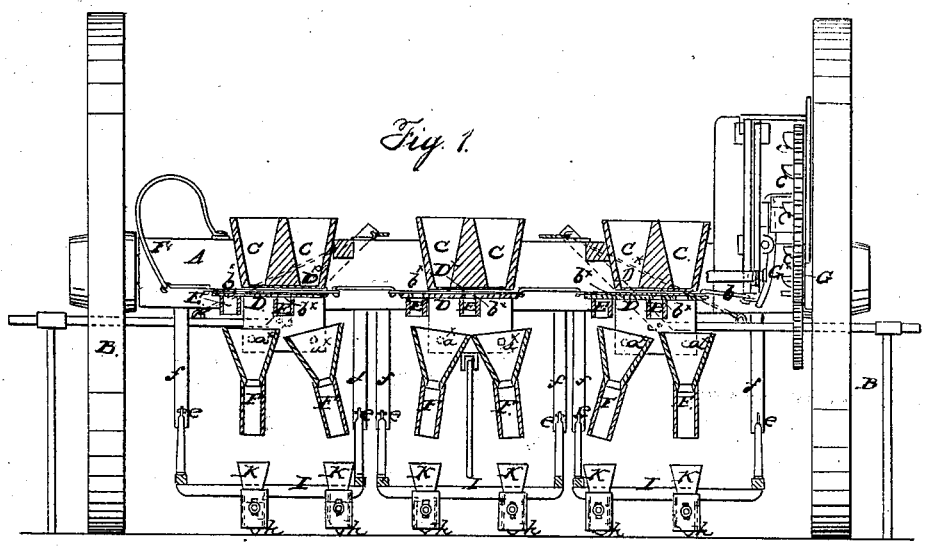
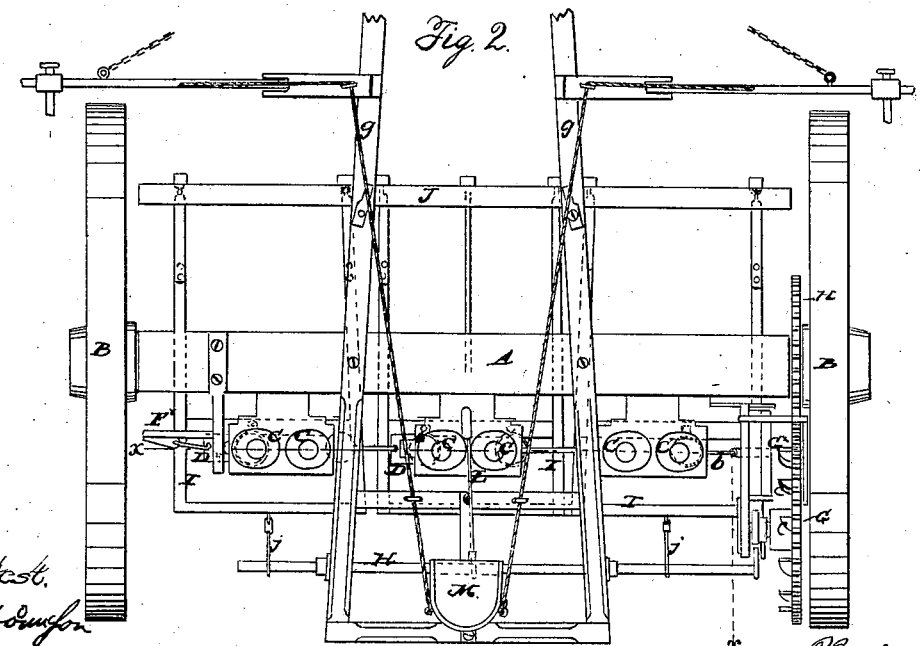

UNITED STATES PATENT OFFICE.

ROBERT BURNS, OF NEW YORK, N. Y.

IMPROVEMENT IN SEEDING-MACHINES.

Specification forming part of Letters Patent No. 48,655, dated July 11, 1865.

*To all whom it may concern:*

Be it known that I, ROBERT BURNS, of the city, county, and State of New York, have invented a new and Improved Seeding-Machine; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x$ $x$, Fig. 2; Fig. 2, a plan or top view of the same.

Similar letters of reference indicate like parts.

This invention relates to a new and improved machine for sowing seed in close drills; and it consists in a peculiar arrangement of means whereby the work may be done in a perfect manner and the seed sown in drills at a greater or less distance apart, as may be desired.

A represents an axle having a wheel, B, at each end of it, and a series of seed-boxes, C, secured to its rear side.

Underneath the seed-boxes there are placed slides D, which are perforated and provided with pendent tubes E. These slides are connected together by rods $a$, and the slide of one of the outer seed-boxes is connected to a spring, F*, and the slide of the seed-box, at the opposite side of the machine is connected by a rod, $b$, with a lever, G*, which is operative by teeth $c$, at one side of a wheel, G, said wheel receiving its motion from a wheel, H, attached to the hub of one of the wheels B, on which the machine is mounted. The slides D have plates D* fitted upon them. These plates are perforated with holes $b$*, and they are removable, so that plates with different-sized holes may be fitted within or upon the slides D.

The wheel G should be arranged in such a manner as to be adjustable and admit of being readily thrown in and out of gear with the wheel H, so as to render the seed-distributing device operative or inoperative when desired The reciprocating motion imparted to the slides D causes the seed to be distributed or discharged from the seed-boxes C, and the tubes E conduct the seed to adjustable tubes F, which are pivoted, as shown at $a$*. By means of these adjustable tubes the seed may be sown in drills at a greater or less distance apart, as will be fully understood by referring to Fig. 1.

I represents a series of frames the front ends of which are connected by joints $e$ to pendants $f$, attached to a cross-bar, J, secured to the thills $g$ of the machine. These frames I have tubes K attached to their rear parts, and the lower ends of these tubes have furrow-openers $h$ secured to them, and coverers or pressers, for pressing the earth down upon the seed, attached to their rear parts. By adjusting or turning the tubes F on their pivots and adjusting the tubes K on the frames I the seed may be sown in drills at a greater or less distance apart, as may be desired. This will be fully understood by referring to Fig. 1.

Seed of different sizes may be sown by using plate D*, provided with different-sized holes.

The furrow-openers may be raised up out of the ground when required by having the rear part of the frames I connected to arms $j$ on a shaft, H, to which a lever, L, is secured, said lever being near the driver's seat M, so as to be within convenient reach of the driver.

Having thus described my invention, I claim as new and desire to secure by Letters Patent—

The perforated reciprocating slides D, provided with pendent tubes E, and having removable plates D* placed within them, in connection with the adjustable or pivoted tubes F, substantially as and for the purpose herein set forth.

ROBERT BURNS.

Witnesses:
M. M. LIVINGSTON,
C. L. TOPLIFF.